(12) United States Patent
Boura et al.

(10) Patent No.: US 10,298,348 B2
(45) Date of Patent: May 21, 2019

(54) TRANSPARENT CLOCKING IN A CROSS CONNECT SYSTEM

(71) Applicant: IPG Photonics Corporation, Oxford, MA (US)

(72) Inventors: Jihad Boura, Northborough, MA (US); George Buabbud, Shrewsbury, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 110 days.

(21) Appl. No.: 15/474,561

(22) Filed: Mar. 30, 2017

(65) Prior Publication Data

US 2017/0288849 A1 Oct. 5, 2017

Related U.S. Application Data

(60) Provisional application No. 62/317,194, filed on Apr. 1, 2016.

(51) Int. Cl.
*H04B 10/00* (2013.01)
*H04J 3/06* (2006.01)

(52) U.S. Cl.
CPC .......... *H04J 3/0691* (2013.01); *H04J 3/0685* (2013.01); *H04J 2203/0089* (2013.01); *H04Q 2213/076* (2013.01)

(58) Field of Classification Search
USPC ................................................. 398/154–155
See application file for complete search history.

(56) References Cited

U.S. PATENT DOCUMENTS

| 5,844,908 A | 12/1998 | McCallan |
| 6,208,672 B1 | 3/2001 | Gunning et al. |
| 6,728,908 B1 | 4/2004 | Fukuhara et al. |
| 6,870,831 B2 | 3/2005 | Hughes et al. |

(Continued)

OTHER PUBLICATIONS

PCT International Search Report and Written Opinion dated Aug. 22, 2017, received in PCT Application No. PCT/US17/25387, 14 pgs.

(Continued)

*Primary Examiner* — Agustin Bello
(74) *Attorney, Agent, or Firm* — Grossman, Tucker, Perreault & Pfleger, PLLC (57) ABSTRACT

A cross connect apparatus or system with transparent clocking, consistent with embodiments described herein, connects a selected source or ingress port to a selected destination or egress port and clocks data out of the selected egress port using a synthesized clock that is adjusted to match a recovered clock from the selected ingress port. A transparent clocking system may generate the synthesized clock signal with adjustments in response to a parts per million (PPM) rate detected for the associated recovered clock signal provided by the selected ingress port. The cross connect system with transparent clocking may be a 400 G cross connect system with 10 G resolution. The cross connect system with transparent clocking may be used in optical transport network (OTN) applications, for example, to provide an aggregator and/or an add-drop multiplexer (ADM) or to provide a reconfigurable optical add-drop multiplexer (ROADM) upgrade to a higher data rate.

16 Claims, 5 Drawing Sheets

(56) References Cited

U.S. PATENT DOCUMENTS

| | | | | |
|---|---|---|---|---|
| 7,102,446 | B1* | 9/2006 | Lee | H03K 23/507 331/11 |
| 7,149,914 | B1* | 12/2006 | Asaduzzaman | H03L 7/087 713/500 |
| 7,243,253 | B1* | 7/2007 | McClary | H04L 12/66 345/537 |
| 7,352,835 | B1* | 4/2008 | Asaduzzaman | H03L 7/0807 375/359 |
| 7,873,073 | B2* | 1/2011 | Frlan | H04L 12/2885 370/466 |
| 8,081,639 | B2* | 12/2011 | Weizeorick | H04J 3/062 370/395.62 |
| 8,274,892 | B2* | 9/2012 | Chiang | H04J 3/1652 370/235 |
| 8,397,096 | B2* | 3/2013 | Shumarayev | H03L 7/0805 710/305 |
| 8,619,931 | B1* | 12/2013 | Pham | H04L 7/0337 375/355 |
| 8,666,013 | B1* | 3/2014 | Khor | H04L 7/0025 327/147 |
| 8,958,514 | B2 | 2/2015 | Bruckman et al. | |
| 9,019,997 | B1* | 4/2015 | Mok | H04B 10/07 370/503 |
| 9,143,142 | B2* | 9/2015 | Meagher | H03L 7/18 |
| 9,236,969 | B2* | 1/2016 | Valiveti | H04J 3/1652 |
| 9,362,926 | B2* | 6/2016 | Dickerson | H03L 7/26 |
| 9,473,261 | B1* | 10/2016 | Tse | H04J 3/1658 |
| 2005/0286521 | A1* | 12/2005 | Chiang | H04J 3/1652 370/389 |
| 2007/0071443 | A1* | 3/2007 | Fukumitsu | H04J 3/07 398/79 |
| 2007/0116061 | A1* | 5/2007 | Meagher | H04J 3/07 370/503 |
| 2008/0267223 | A1* | 10/2008 | Meagher | H04J 3/07 370/505 |
| 2009/0074410 | A1 | 3/2009 | Zou et al. | |
| 2009/0213873 | A1* | 8/2009 | Frlan | H04J 3/1658 370/464 |
| 2009/0238320 | A1* | 9/2009 | Ji | H04J 3/0658 375/362 |
| 2010/0192003 | A1* | 7/2010 | Weizeorick | G06F 1/14 713/500 |
| 2011/0285434 | A1* | 11/2011 | Shumarayev | H03L 7/0805 327/156 |
| 2011/0286744 | A1* | 11/2011 | Shin | H04J 3/1652 398/45 |
| 2012/0039609 | A1* | 2/2012 | Dong | H04J 3/1652 398/66 |
| 2012/0251106 | A1* | 10/2012 | Valiveti | H04L 47/125 398/45 |
| 2012/0269511 | A1* | 10/2012 | Calderon | H04J 3/1664 398/58 |
| 2013/0004169 | A1* | 1/2013 | Mohamad | H04J 3/0691 398/45 |
| 2013/0108273 | A1* | 5/2013 | Valiveti | H04J 3/1652 398/79 |
| 2016/0050470 | A1 | 2/2016 | Swinkels et al. | |
| 2016/0072513 | A1* | 3/2016 | Dickerson | H03L 7/26 331/16 |
| 2016/0261275 | A1* | 9/2016 | Dickerson | H03L 7/26 |
| 2017/0288849 | A1* | 10/2017 | Boura | H04J 3/0691 |
| 2017/0317759 | A1* | 11/2017 | Agazzi | H04B 10/516 |

OTHER PUBLICATIONS

"Optical Transport Network Switching: Creating efficient and cost-effective optical transport networks", Nokia Siemens Networks, 2011, pp. 1-16.

OTN Family/ "ODU Multiplexers for ODU Cross-Connect/TPOC244/TPOC314", Altera Corporation, 2013, 2 pgs.

Murakami, Makoto, Analyzing Power Consumption in Optical Cross-connect Equipment for Future Large-Capacity Optical Networks, Journal of Networks, vol. 5, No. 11, Nov. 2010, NTT Network Service Systems Laboratories, Tokyo, Japan, 2010 Academy Publisher, pp. 1254-1259.

"Introduction to Gapped Clocks and PLLs", Silicon Laboratories, 2010, 14 pgs.

"Gigabit Transceiver Block Highlights", Stratix GX Device Handbook, vol. 2, Altera Corporation, Jun. 2006, pp. 1-1 to 1-10.

"Receiver Phase Compensation FIFO", Altera Corporation, Dec. 2010, pp. 1-14.

* cited by examiner

TRANSPARENT CLOCKING IN A CROSS CONNECT SYSTEM

The present application claims the benefit of U.S. Provisional Patent Application Ser. No. 62/317,194 filed on Apr. 1, 2016, which is fully incorporated herein by reference.

TECHNICAL FIELD

The present disclosure relates to cross connect systems and more particularly, to transparent clocking in a cross connect system.

BACKGROUND INFORMATION

A cross connect system may be used to connect any one of a plurality of source or ingress ports to any one of a plurality of destination or egress ports. Data received from a source device coupled to the selected source/ingress port may thus be connected to the selected destination/egress port for transmission to a destination device. Optical cross connects, for example, may be used to reconfigure optical networks dynamically, for example, to manage traffic on the networks. Electrical-switching-based optical cross connects convert optical data signals to electrical data signals, perform electrical switching of the data signals between the ports, and then convert the electrical data signals back to optical data signals.

When electrical data signals are received, clock signals are recovered from the data signals and the recovered clock signals are used to clock the recovered data into the ingress ports and to clock data out of the egress ports. To use the same clock rate to clock the data out of the egress ports, e.g., to match input and output clock rates, the recovered clock signals may be multiplexed with the data being connected to the selected egress ports. Thus, every egress port is configured to be clocked by all of the ingress ports, and every ingress clock needs to be compensated for by every egress port. When a large number of ingress and egress ports are being cross connected, collapsing the multiple different clock domains is challenging, particularly in an FPGA implementation with limited clock resources. A 400 G cross connect system with 10 G resolution, for example, involves collapsing 40 different clock domains.

BRIEF DESCRIPTION OF THE DRAWINGS

These and other features and advantages will be better understood by reading the following detailed description, taken together with the drawings wherein.

DETAILED DESCRIPTION

A cross connect apparatus or system with transparent clocking, consistent with embodiments described herein, connects a selected source or ingress port to a selected destination or egress port and clocks data out of the selected egress port using a synthesized clock that is adjusted to match a recovered clock from the selected ingress port. A transparent clocking system may generate the synthesized clock signal with adjustments in response to a parts per million (PPM) rate detected for the associated recovered clock signal provided by the selected ingress port. The cross connect system with transparent clocking may be a 400 G cross connect system with 10 G resolution. The cross connect system with transparent clocking may be used in optical transport network (OTN) applications, for example, to provide an aggregator and/or an add-drop multiplexer (ADM) or to provide a reconfigurable optical add-drop multiplexer (ROADM) upgrade to a higher data rate (e.g., 10 G to 100 G).

Figure 1:
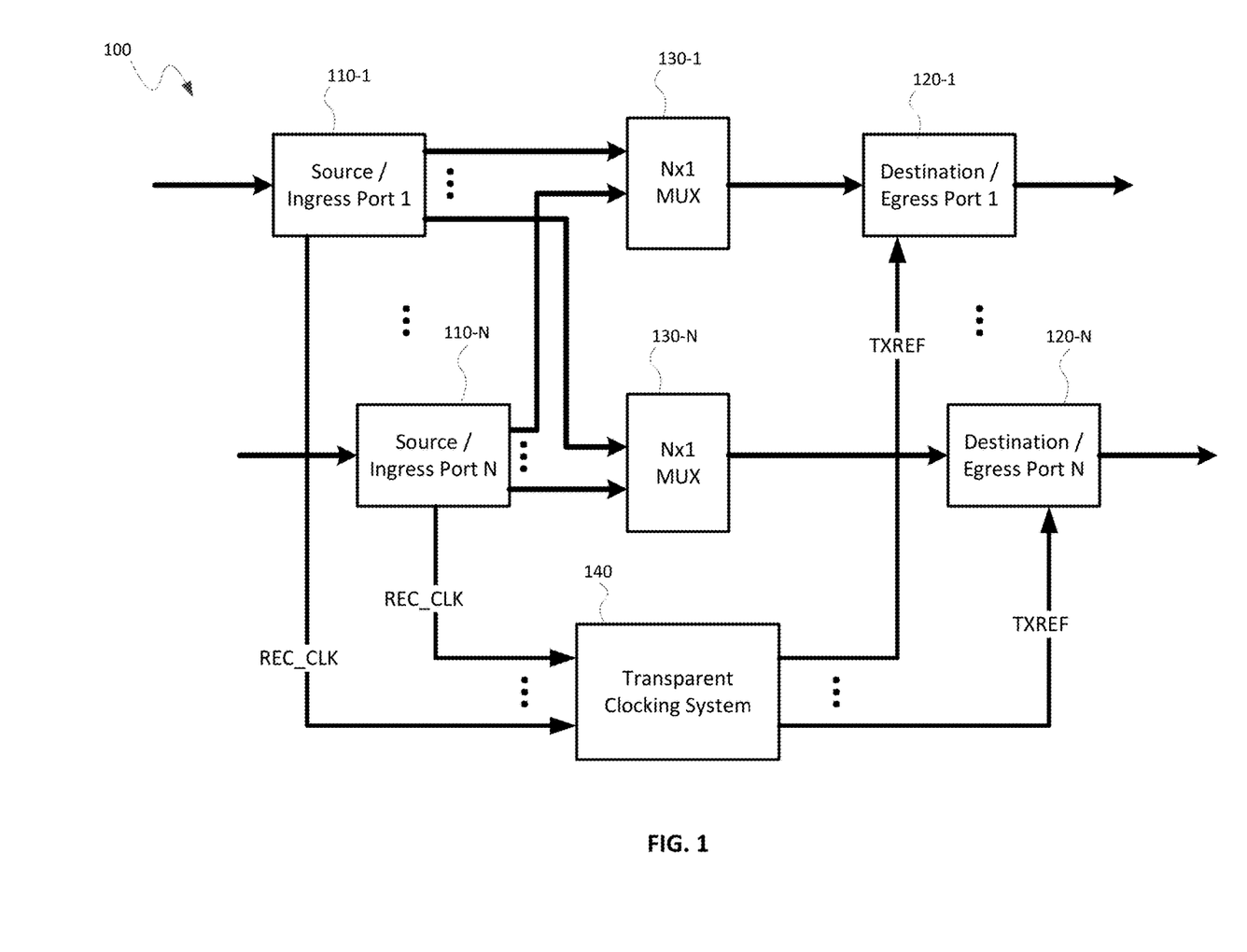
FIG. 1 is a schematic diagram of a cross connect system including a transparent clocking system, consistent with an embodiment of the present disclosure.

Referring to FIG. 1, a cross connect system 100, consistent with embodiments of the present disclosure, generally includes a plurality of source or ingress ports 110-1 to 110-N connected to a plurality of destination or egress ports 120-1 to 120-N via a plurality of multiplexers 130-1 to 130-N. Any one of the ingress ports 110-1 to 110-N may thus be connected to any one of the egress ports 120-1 to 110-N. Thus, the number of potential ingress to egress combinations allows for a large number of potential mappings. For instance, and in one non-limiting example embodiment, a 40 port system may be capable of 1600 potential ingress-egress, mappings (40×40=1600). Other port configurations, e.g., 10×10, 20×20, 6033 60, are also within the scope of this disclosure.

Each of the source/ingress ports 110-1 to 110-N may include circuitry for receiving data signals and recovering data and clock signals (REC_CLK). Each one of the destination/egress ports 120-1 to 120-N may include circuitry for transmitting data signals that have been clocked using a synthesized clock signal (TXREF) adjusted to match a recovered clock signal (REC_CLK) from a selected one of the ingress ports 110-1 to 110-N being connected. The cross connect system 100 includes a transparent clocking system 140 for generating the synthesized clock signals (TXREF) in response to the recovered clock signals (REC_CLK), as will be described in greater detail below. As generally referred to herein, a transparent clock refers to an approach whereby the TX output clock (TXREF) for an egress port operates without direct synchronization with an associated input clock (REC_CLK) of a mapped ingress port. Instead, the TX output clock (TXREF) may be synthetically generated based on a measured clock rate difference (e.g., in parts per million (PPM)) between a recovered clock associated with an ingress port and a TX reference clock, with the TX reference clock have a rate greater than the associated input clock. The data being connected to a selected egress port from a selected ingress port may thus be clocked transparently through the cross connect system using a consistent and highly-accurate clock rate without having to multiplex the recovered clock signals, e.g., without having to maintain a separate clock or otherwise allocate dedicated clock resources for each ingress-egress port combination. Such a system is thus capable of handling multiple clock domains, e.g., up to 40 input/output ports or more, with limited clock resources, e.g., in a FPGA, Silicon Integrated Circuit (SIC) or other chip implementation having constrained clock resources. Accordingly, N number of ingress ports may be cross connected to N number of egress ports in a 1:1 fashion, with updates to the mappings between input and output ports being dynamic, e.g., based on user input, a remote command, dip switches, and other suitable programming approaches. This may allow for ports to be initially cross-coupled in a desired configuration, e.g., during factory configuration or site installation, and optionally reconfigured during operation for purposes of load balancing, traffic rerouting (e.g., in the event of a fault), network topology changes, unit swap-outs, and so on.

Figure 2:
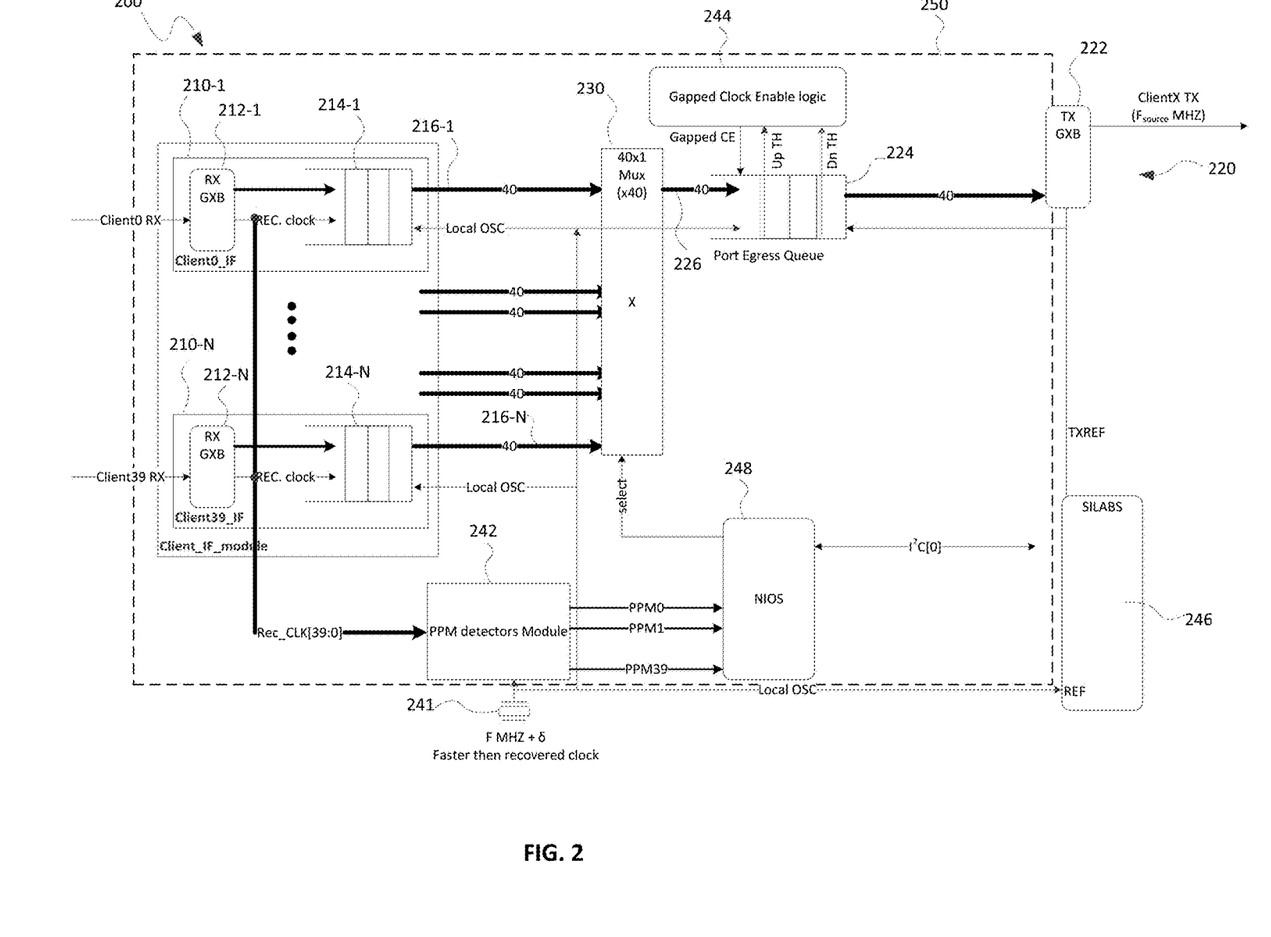
FIG. 2 is a schematic diagram of a 400 G cross connect system with 10 G resolution including transparent clocking, consistent with an embodiment of the present disclosure.

Referring to FIG. 2, an embodiment of a cross connect system 200 with transparent clocking is shown and described in greater detail. As shown, the cross connect system 200 includes a plurality of source/ingress ports 210-1 to 210-N coupled to a destination port 220 via a multiplexer 230. Although a single multiplexer 230 and destination port 220 is shown, the cross connect system 200 may include a plurality of multiplexers 230 connected to a plurality of respective destination ports 220 depending on a desired configuration. Other switching logic may also be used and the particular embodiment shown should not be construed as limiting. The cross connect system 200 may be implemented, whole or in part, within a single package 250. The single package 250 may comprise an FPGA, a SIC, or other suitable chip, for example. In some cases, the reference LO 241 and TX clock generator 246 may be implemented within separate chips/circuitry.

Each multiplexer 230 multiplexes a plurality of data paths 216-1 to 216-N from the plurality of respective source/ingress ports 210-1 to 210-N onto a single data path 226 to the respective destination/egress port 220. This defines a static connection that establishes the connection from ingress port to egress port on the cross connect system 200. Each of the data paths 216-1 to 216-N may include a multiple bit bus for connecting to multiple respective destinations.

In the illustrated embodiment showing a 400 G cross connect system 200 with 10 G resolution, 40 source/ingress ports 210-1 to 210-N each receive data signals at a 10 G data rate. Each destination/egress port 220 may thus get its inputs from 40 source/ingress ports 210-1 to 210-N. In this example, the source/ingress ports 210-1 to 210-N are connected to 40 bit bus data paths 216-1 to 216-N, respectively. The source/ingress ports 210-1 to 210-N may be implemented in client interfaces receiving OTU2 data signals as defined by the Optical Transport Network (OTN) standard (also known as ITU-T Recommendation G.709), although other embodiments are also within the scope of this disclosure.

Each of the source/ingress ports 210-1 to 210-N includes a receiver 212-1 to 212-N coupled to an ingress FIFO module 214-1 to 214-N. The receivers 212-1 to 212-N receive data signals (e.g., Client0 RX to Client39 RX) and recover the data and clock from the respective received data signals. The recovered data is clocked into the ingress FIFO module 214-1 to 214-N of each respective source/ingress port using the recovered clock signal. The data paths 216-1 to 216-N from the ingress FIFO modules 214-1 to 214-N may be multiplexed into the single data path 226 to the destination/egress port 220 through a user selectable destination register. The selection register may include a two dimensional data structure representing all possible ingress-egress combinations. For each egress port, for example, there may be a 6 bit vector that represents the ID of the ingress port that is feeding it, although other address/register schemes may be used. In the example embodiment, there may be 40 selectable destination registers. Each destination/egress port 220 includes a transmitter 222 coupled to an egress FIFO module 224. The multiplexed data is clocked into the egress FIFO module 224 from the multiplexed data path 226 and clocked out of the egress FIFO module 224 for transmission by the transmitter 222, as will be described in greater detail below. The receivers and transmitters may be part of a gigabit transceiver block (GXB).

To provide the transparent clocking, this embodiment of the cross connect system 200 further includes a local oscillator (LO) 241 or reference LO 241, a parts per million (PPM) detectors module 242, gapped clock enable logic 244, a TX clock generator 246, and control logic 248 such as a processor or a dedicated finite state machine (FSM). The TX clock generator 246 may be implemented as a phase locked loop (PLL) or any other circuitry/chip capable of fine-grain PPM adjustment to match ingress-egress clock rates. Although one TX clock generator 246 is shown, this disclosure is not necessarily limited in this regard. For example, each TX clock generator 246 may service one or more egress ports, and thus, the cross connect system 200 may include N number of TX clock generators. The reference LO 241 provides a local clock signal, running faster than any of the recovered clock signals, to each of the ingress FIFO modules 214-1 to 214-N, to each egress FIFO module 224, to the PPM detectors module 242, and to the TX clock generator 246. A single reference LO, e.g., reference LO 241, may be utilized to accommodate N number of input-output/ingress-egress ports, although in some implementations two or more reference LO ports may be utilized depending on a desired configuration. This advantageously avoids the necessity of having a separate clock maintained for each potential ingress-egress port mapping.

Data may be clocked from a FIFO modules 214-1 to 214-N to a mapped egress queue, e.g., egress FIFO module 224, based on the clock rate of the reference LO 241. The PPM detectors module 242 may include a PPM detector for each of the source/ingress ports 210-1 to 210-N to detect a PPM rate of the recovered clock for each of the source/ingress ports 210-1 to 210-N relative to the reference LO 241. The gapped clock enable logic 244 monitors the FIFO fill levels of the egress FIFO module 224 and adjusts the write clock of the egress FIFO module 224 to skip a clock cycle as needed to match the data rate of the selected source/ingress port. By way of example, consider a recovered clock equals 40 Gps and the reference LO 241 is operating at a faster rate such as 10× the recovered clock. In this example, $\frac{1}{10}^{th}$ of the overall clocks cycles may be "skipped" to cause data to be output by a transmitter, e.g., 222, at a matching rate of 40 Gbps. In some cases, the gapped clock enable logic 244 outputs a signal, e.g., a skip signal, to cause one or more clock ticks to be skipped/ignored.

To achieve this matched rate between input and mapped output, the TX clock generator 246 generates the synthesized clock signal (TXREF) for clocking data from the read side of the egress FIFO module 224. The control logic 248 controls the selection of the source and destination ports, receives the PPM rates from the PPM detectors module 242, and communicates with the TX clock generator 246, for example, using $I^2C$ controller integration. The control logic 248 may thus select one of the source ports 210-1 to 210-N via the multiplexer 230 to establish a connection to the destination port 220, e.g., based on a user-defined mapping, and then pass the detected PPM rate for the selected source port to the TX clock generator 246. As discussed above, the PPM rate is relative to difference between the reference LO 241 and a recovered clock. The TX clock generator 246 may then adjust or otherwise fine-tune the synthesized clock (TXREF) based on the PPM difference relative to the local oscillator signal used to clock data into the egress FIFO module 224. The synthesized clock signal (TXREF) thus matches the recovered clock frequency for the selected ingress port being connected to the egress port, and each of the ingress ports may have its own synthesized clock signal generated by the TX clock generator 246 and used as a transmit reference at the connected egress port. The clocking throughout the cross connect system 200 may thus be transparent such that the following equation is satisfied: the recovered clock=the gapped local oscillator=TXREF.

Figure 3:
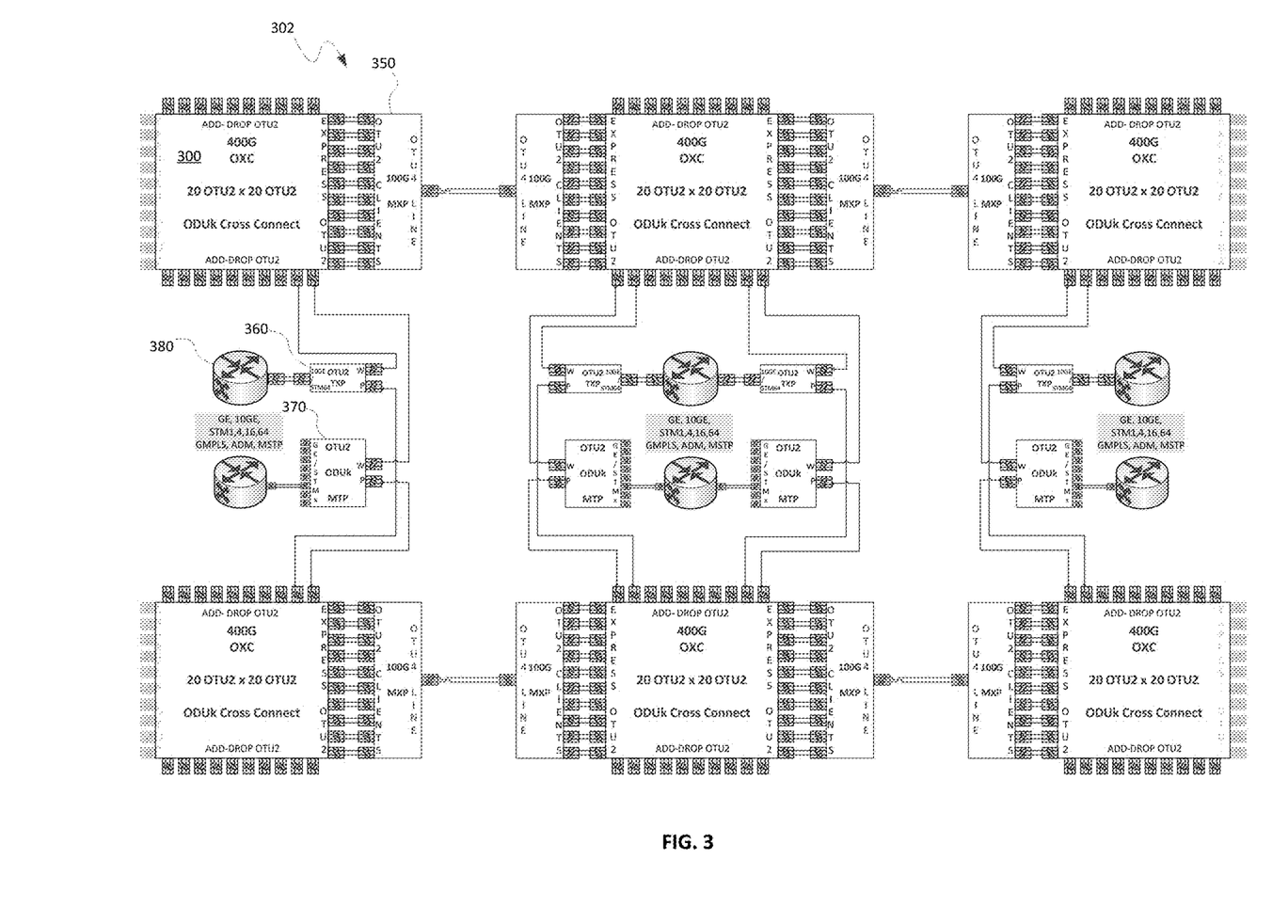
FIG. 3 illustrates one application for a cross connect system, consistent with embodiments of the present disclosure, as an aggregator and add-drop multiplexer (ADM).
Figure 4:
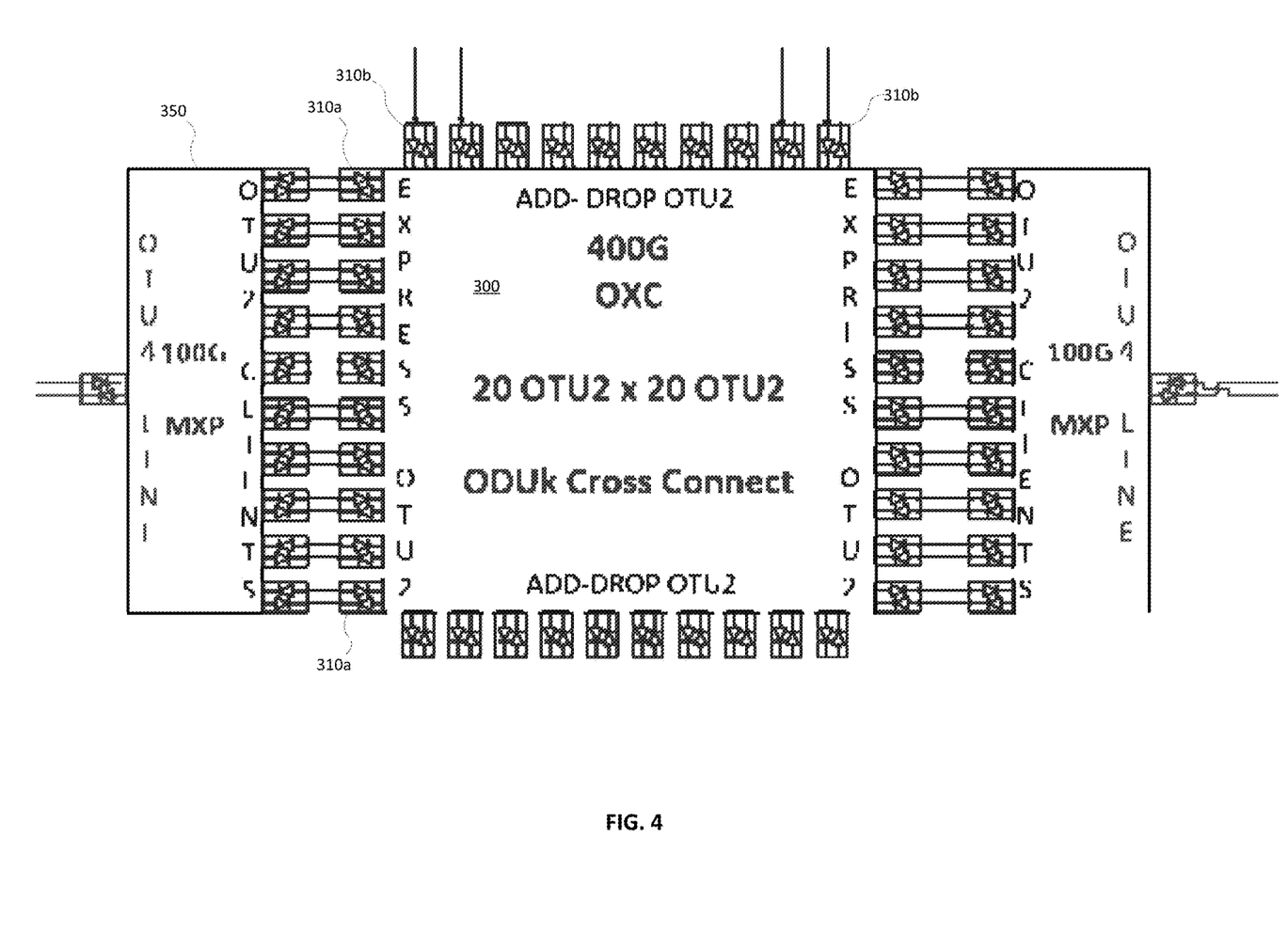
FIG. 4 is an enlarged view of an ODUk cross connect shown in FIG. 3.
Figure 5:
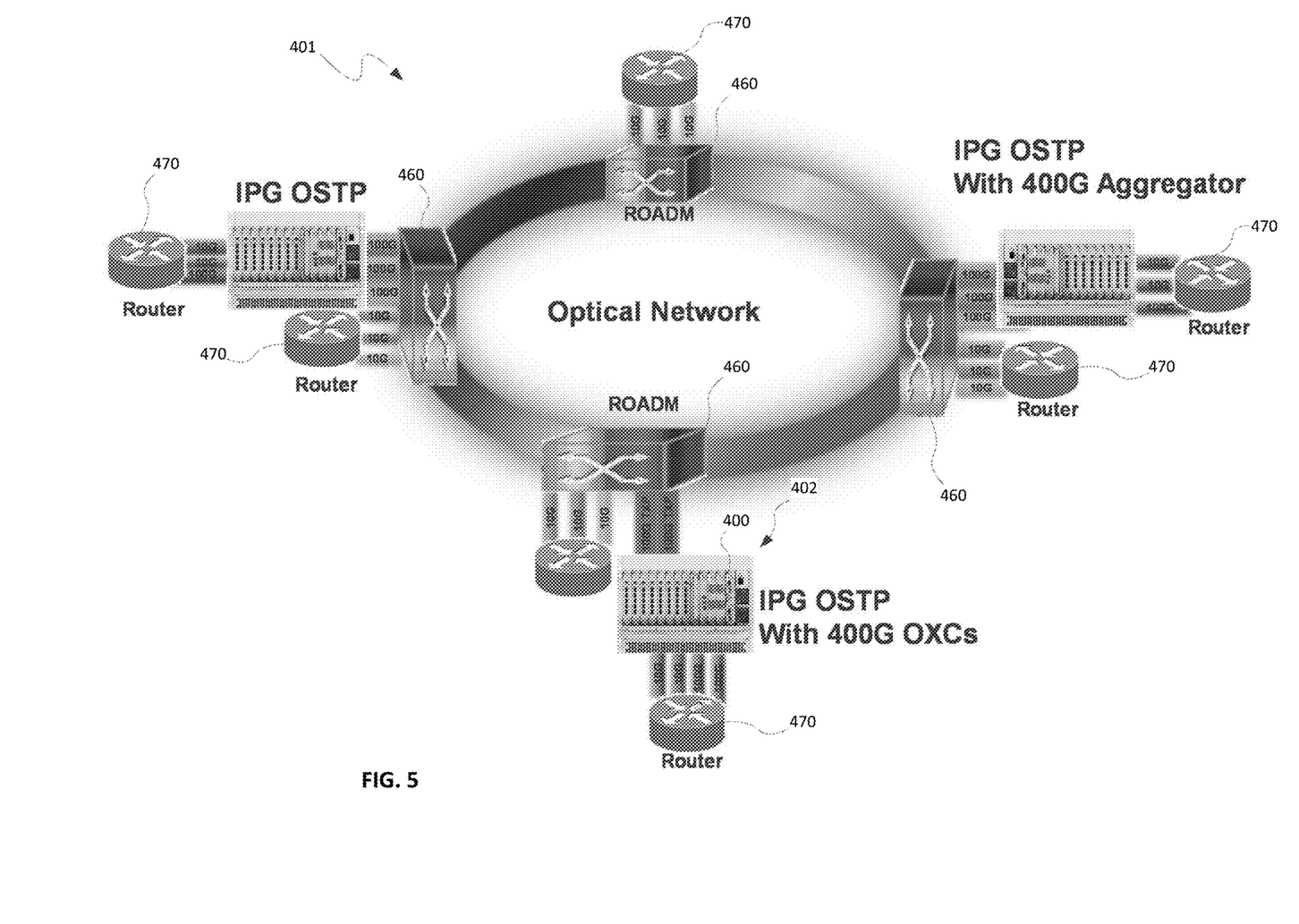
FIG. 5 illustrates another application for a cross connect system, consistent with embodiments of the present disclosure, in an optical services transport platform (OSTP) for upgrading a reconfigurable optical add-drop multiplexer (ROADM) system.

FIGS. 3-5 illustrate OTN applications for embodiments of a cross connect apparatus or system with transparent clocking. In these embodiments, the cross connect system apparatus or system is an electrical-switching based optical cross connect (OXC).

Referring to FIGS. 3 and 4, a cross connect apparatus or system with transparent clocking, consistent with embodiments described herein, may be used as an aggregator and/or ADM. In the illustrated embodiment, a system 302 includes at least one ODUk cross connect apparatus 300 including a plurality of express ports 310a including pairs of ingress ports and egress ports and a plurality of add-drop ports 310b including pairs of ingress ports and egress ports. One or more muxponders (MXPs) 350 are connected to one or more groups of the express ports 310a. One or more transponders, such as transponder 360 and multi-mode transponder 370, are connected to one or more add-drop ports 310b. In the illustrated embodiment, the ODUk cross connect apparatus 300 is a 400 G cross connect providing 20 OTU2×20 OTU2 connectivity; however, other embodiments are within the scope of the present disclosure.

Referring to FIG. 5, a cross connect system with transparent clocking, consistent with embodiments described herein, may be used to provide a ROADM system upgrade to a higher data rate (e.g., from 10 G to 100 G). In the illustrated embodiment, an optical network 401 includes ROADMs 460 coupled to routers 470. To upgrade to 100 G, an optical services transport platform (OSTP) 402 with an optical cross connect 400 is coupled between the ROADM 460 and the router 470.

Accordingly, a cross connect apparatus or system with transparent clocking is capable of handling multiple clock domains without multiplexing the recovered clock signals and with limited clock resources (e.g., in a FPGA implementation). This advantageously minimizes the overall number of components to accomplish flexible cross connecting of ports, which reduces the potential for component failure and reduces the overall physical footprint of cross connect circuitry to achieve high-density implementations. An electrical-switching-based optical cross connect (OXC) may be useful, for example, in high data rate OTN applications.

In accordance with an aspect of the disclosure an apparatus is disclosed. The apparatus including a plurality of source ports for receiving data signals from sources and recovering clock signals from the data signals, a plurality of destination ports for transmitting data signals to destinations, a plurality of multiplexers coupled between the source ports and the destination ports, the multiplexers being configured to selectively pass the data signals from a selected one of the source ports to a selected one of the destination ports, and a transparent clocking system configured to generate synthesized clock signals adjusted to match recovered clock signals for selected ones of the source ports and configured to clock data from selected ones of the destination ports without multiplexing the recovered clock signals.

In accordance with another aspect of the present disclosure an apparatus is disclosed. The apparatus comprising a plurality of source ports for receiving data signals and recovering clock signals, each of the source ports being configured to clock recovered data into an ingress FIFO module, at least one destination port for transmitting data signals, the at least one destination port being configured to clock data out of an egress FIFO module, at least one multiplexer coupled between the source ports and the at least one destination port, the at least one multiplexer being configured to multiplex a plurality of data paths from the plurality of source ports to a single data path to the at least one destination port and to select one of the source ports for connection to the destination port, a local oscillator running faster than the recovered clock signals, for clocking data into the egress FIFO module, a parts per million (PPM) detectors module configured to detect PPM rates of selected recovered clock signals, gapped clock enable logic configured to adjust a write clock of the egress FIFO module in response to a data rate of a corresponding selected recovered clock signal, a clock generator configured to generate a synthesized clock signal for the at least one destination port in response to the detected PPM rate of the selected recovered clock signal, and control logic implemented as a processor or finite state machine, the control logic coupled to the PPM detectors module, the multiplexer, and the clock generator, the control logic being configured to control selection of the source ports via the multiplexer and to receive the PPM rates and pass the PPM rate of the corresponding selected recovered clock signal to the clock generator.

In accordance with another aspect of the present disclosure a system is disclosed. The system comprising at least one ODUk cross connect apparatus comprising, a plurality of OTU express ports including pairs of ingress ports and egress ports, a plurality of OTU add-drop ports including pairs of ingress ports and egress ports, a plurality of multiplexers between ingress ports and egress ports, the multiplexers being configured to selectively pass data signals from any one of the ingress ports to any one of the egress ports, and a transparent clocking system configured to generate synthesized clock signals adjusted to match recovered clock signals for selected ones of the ingress ports and configured to clock data from selected ones of the egress ports without multiplexing the recovered clock signals, at least a first muxponder coupled to at least a first group of the express ports, and at least one transponder coupled to at least one of the add-drop ports.

In accordance with another aspect of the present disclosure a system is disclosed. The system comprising an optical services transport platform (OSTP) configured to be coupled to a reconfigurable optical add-drop multiplexer (ROADM) and configured to be coupled to a router, and an optical cross connect apparatus comprising a plurality of ingress ports and a plurality of egress ports, a plurality of multiplexers between ingress ports and egress ports of the client interfaces, the multiplexers being configured to selectively pass data signals from any one of the ingress ports to any one of the egress ports, and a transparent clocking system configured to generate synthesized clock signals adjusted to match recovered clock signals for selected ones of the ingress ports and configured to clock data from selected ones of the egress ports without multiplexing the recovered clock signals.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An apparatus comprising:
   a plurality of source ports for receiving data signals from sources and recovering clock signals from the data signals;
   a plurality of destination ports for transmitting data signals to destinations;
   a plurality of multiplexers coupled between the source ports and the destination ports, the multiplexers being configured to selectively pass the data signals from a selected one of the source ports to a selected one of the destination ports; and
   a transparent clocking system configured to generate synthesized clock signals adjusted to match recovered clock signals for selected ones of the source ports and configured to clock data from selected ones of the destination ports without multiplexing the recovered clock signals.

2. The apparatus of claim 1 wherein each of the source ports include a receiver configured to receive a source data signal and to recover data and a recovered clock signal from the source data signal and an ingress FIFO module configured to receive the data clocked using the recovered clock signal, and wherein each of the destination ports includes an egress FIFO module configured to receive data from the multiplexers and a transmitter configured to transmit a destination data signal including data read out from the egress FIFO module and clocked using a synthesized clock signal.

3. The apparatus of claim 2 wherein the transparent clocking system comprises:
   a local oscillator running faster than the recovered clock signals for clocking data into the egress FIFO module of each of the destination ports;
   a parts per million (PPM) detectors module configured to detect PPM rates of the recovered clock signals;
   gapped clock enable logic configured to adjust a write clock of the egress FIFO module of each of the destination ports in response to a data rate of a corresponding selected recovered clock signal; and
   a clock generator configured to generate the synthesized clock signals for the destination port in response to the detected PPM rate of the selected recovered clock signals.

4. The apparatus of claim 3 further including control logic coupled to the PPM detector, the multiplexers, and the clock generator, wherein the control logic is configured to select a destination port via the multiplexer and to select a PPM rate corresponding to a selected source port and provide the PPM rate to the clock generator, the control logic being a processor or finite state machine.

5. The apparatus of claim 4 wherein the processor communicates with the clock generator via an I²C controller integration.

6. The apparatus of claim 4 wherein the control logic is a finite state machine.

7. The apparatus of claim 1 wherein the source ports include 40 source ports and each of the source ports are configured to receive data at a 10 G data rate.

8. An apparatus comprising:
   a plurality of source ports for receiving data signals and recovering clock signals, each of the source ports being configured to clock recovered data into an ingress FIFO module;
   at least one destination port for transmitting data signals, the at least one destination port being configured to clock data out of an egress FIFO module;
   at least one multiplexer coupled between the source ports and the at least one destination port, the at least one multiplexer being configured to multiplex a plurality of data paths from the plurality of source ports to a single data path to the at least one destination port and to select one of the source ports for connection to the destination port;
   a local oscillator running faster than the recovered clock signals, for clocking data into the egress FIFO module;
   a parts per million (PPM) detectors module configured to detect PPM rates of selected recovered clock signals;
   gapped clock enable logic configured to adjust a write clock of the egress FIFO module in response to a data rate of a corresponding selected recovered clock signal;
   a clock generator configured to generate a synthesized clock signal for the at least one destination port in response to the detected PPM rate of the selected recovered clock signal; and
   control logic implemented as a processor or finite state machine, the control logic coupled to the PPM detectors module, the multiplexer, and the clock generator, the control logic being configured to control selection of the source ports via the multiplexer and to receive the PPM rates and pass the PPM rate of the corresponding selected recovered clock signal to the clock generator.

9. The apparatus of claim 8 wherein the source ports include 40 source ports and each of the source ports are configured to receive a 10 G data signal.

10. The apparatus of claim 8 wherein the processor communicates with the clock generator via an I²C controller integration.

11. The apparatus of claim 8 wherein the apparatus is implemented as a FPGA or SIC.

12. A system comprising:
    at least one ODUk cross connect apparatus comprising:
       a plurality of OTU express ports including pairs of ingress ports and egress ports;
       a plurality of OTU add-drop ports including pairs of ingress ports and egress ports;
       a plurality of multiplexers between ingress ports and egress ports, the multiplexers being configured to selectively pass data signals from any one of the ingress ports to any one of the egress ports; and
       a transparent clocking system configured to generate synthesized clock signals adjusted to match recovered clock signals for selected ones of the ingress ports and configured to clock data from selected ones of the egress ports without multiplexing the recovered clock signals;
    at least a first muxponder coupled to at least a first group of the express ports; and
    at least one transponder coupled to at least one of the add-drop ports.

13. The system of claim 12 wherein the ODUk cross connect apparatus is a 400 G ODUk cross connect apparatus providing 20 OTU2×20 OTU2 connectivity.

14. The system of claim 12 further comprising a second muxponder coupled to a second group of the express ports.

15. A system comprising:
an optical services transport platform (OSTP) configured to be coupled to a reconfigurable optical add-drop multiplexer (ROADM) and configured to be coupled to a router; and
an optical cross connect apparatus comprising:
  a plurality of ingress ports and a plurality of egress ports;
  a plurality of multiplexers between ingress ports and egress ports of the client interfaces, the multiplexers being configured to selectively pass data signals from any one of the ingress ports to any one of the egress ports; and
  a transparent clocking system configured to generate synthesized clock signals adjusted to match recovered clock signals for selected ones of the ingress ports and configured to clock data from selected ones of the egress ports without multiplexing the recovered clock signals.

16. The system of claim 15 wherein the optical cross connect apparatus is a 400 G cross connect apparatus providing 20 OTU2×20 OTU2 connectivity.

\* \* \* \* \*